Oct. 14, 1958     M. H. GREENBLATT     2,856,524
ELECTRONIC GENERATOR
Filed Feb. 1, 1954

INVENTOR.
Manuel H. Greenblatt
BY Morris     ATTORNEY

United States Patent Office 2,856,524
Patented Oct. 14, 1958

2,856,524

ELECTRONIC GENERATOR

Manuel H. Greenblatt, Princeton, N. J., assignor to Radio Corporation of America, a corporation of Delaware Application February 1, 1954, Serial No. 407,478

5 Claims. (Cl. 250—27)

The present invention relates to electronic generators and more particularly to a novel method of and means for generating a corresponding electrical signal having a slow repetition rate (long period) from an electrical signal having a rapid and regular repetition rate (short period).

To display a waveform having a rapid repetition rate or high frequency on a simple oscilloscope, a very high frequency sawtooth deflection voltage is necessary. A simple oscilloscope such as may be found in every day laboratory use is only equipped to generate sawtooth voltages having frequencies from a few cycles per second to perhaps twenty or thirty thousand cycles per second. Hence, a long desired objective in art of oscillography is to display an exact replica of the signal having a rapid repetition rate (short period) on a simple oscilloscope. The present invention provides an apparatus and method for accomplishing this result if the signal to be displayed has a regular repetition rate. Therefore, this invention is applicable to regular pulse trains, sinusoidal voltages, and other regularly repetitive waveforms.

Briefly, this invention comprises intensity modulating the electron beam produced in a cathode ray tube according to the rapid electrical signal which is to be displayed, then connecting a high frequency voltage on which a low frequency voltage is superimposed to a pair of deflection plates in the cathode ray tube. The period of the high frequency voltage is the same as or an integral multiple of the period of the rapid signal. The high frequency voltage is preferably synchronized with the rapid signal or may be generated by the signal source. The cathode ray tube is constructed with a thin, conductive wire placed close to its screen so that the wire may be traversed by the deflected electron beam. This wire derives a signal from the electron beam, and the signal derived is a replica of the rapid signal, but which now has a repetition rate equal to the frequency of the low frequency voltage. The derived signal may be displayed on a simple oscilloscope.

An object of the present invention is to provide a method of and apparatus for generating a signal having a slow repetition rate corresponding to a signal having a rapid regular repetition rate.

Another object of the invention is to provide a method of and apparatus for generating a signal having a slow repetition rate corresponding to a signal having a rapid repetition rate in which a cathode ray tube is used.

The objects and advantages of the present invention will, of course, become apparent and immediately suggest themselves to those skilled in the art to which the invention is directed from a reading of the following specification in connection with the accompanying drawings in which.

Figure 1:
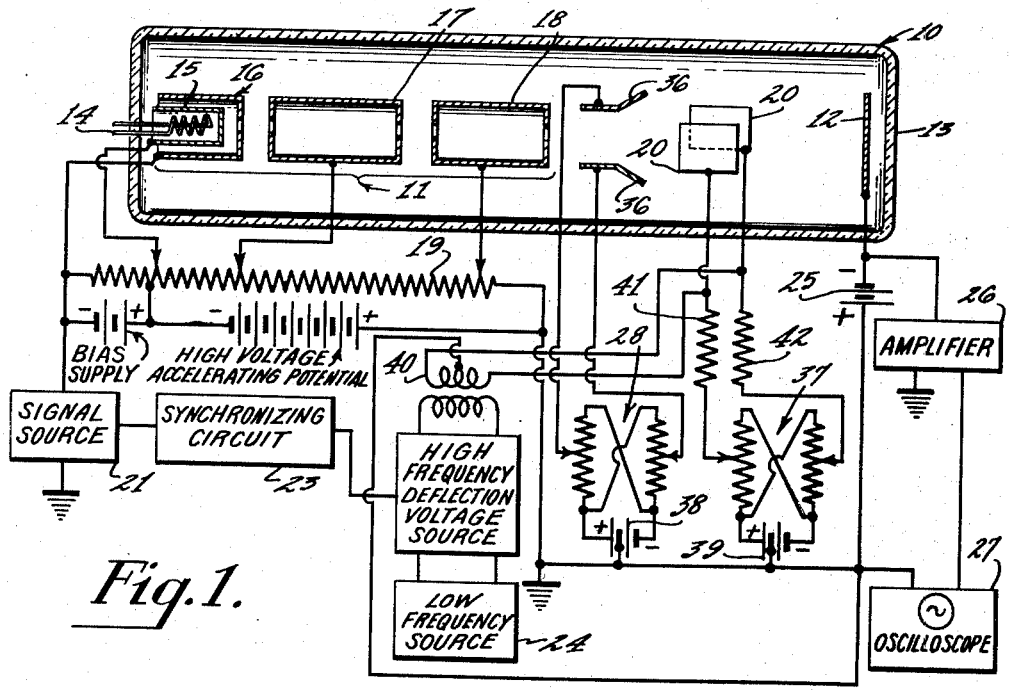
Figure 1 is a sectional view of a cathode ray tube constructed according to one embodiment of the invention including a schematic showing of the circuits used in conjunction with the tube.

Referring to Figure 1, a cathode ray tube is shown having an envelope 10 and a screen 13 at its end. An electron gun 11 is situated at one end of the tube, and a conductor 12 is positioned transverse to the axis of the tube close to the screen 13. The conductor 12 is of relatively small diameter and good results will be obtained if it is a wire of approximately the same diameter as the focused electron beam.

The electron gun 11 contains a heater element 14 surrounded by a thermionic cathode 15. Adjacent to the cathode 15 is the control electrode 16. Accelerating electrodes 17 and 18 are positioned along the tube axis. Accelerating potential is impressed across a resistor 19 and the required accelerating potentials are tapped off and impressed on the electrodes. Bias is supplied to the control electrode from a bias supply connected across part of the accelerating potential supply resistor 19. For simplicity electrostatic focusing is illustrated in this embodiment of the invention. However, electromagnetic or any other well known method of focusing may be employed.

Two pairs of deflection plates 20 and 36 are disposed, according to normal practice, farther down the neck of the envelope 10. The average potential of the plates is made equal to the potential of the closest accelerating electrode 18 by connecting to that electrode 18 the center taps of the D.-C. beam-centering voltage supply batteries 38 and 39 as is also the usual engineering practice. Two beam centering control potentiometer circuits 28 and 37 are connected to the vertical and horizontal deflection plates respectively. The D.-C. beam-centering voltage supply batteries 38 and 39 are connected to these potentiometer circuits. The pair of plates 36 serves to locate the beam trace on a desired part of the screen 13.

A source of signals having a rapid, regular repetition rate 21 is connected to the control electrode 16. These signals modulate the intensity of the electron beam produced by the electron gun structure 11. This is sometimes called Z-axis modulation. If a pulse signal 45 as illustrated in Figure 2 is applied from the source 21 to the control electrode 16 two bursts of electrons occur per repetition time of the signal for the type of signal selected for purposes of illustration.

A high frequency voltage source 22 is coupled to the horizontal deflection plate 20 by means, for example, of a transformer 40. The output of the source 22 may be sinusoidal. The means that is selected for coupling depends upon the frequency at which the high frequency source 22 operates. Two resistors 41 and 42 are provided to aid in isolating the beam-centering circuit 37 from the deflection voltages.

The period of the voltage generated by the high frequency voltage source 22 is equal to the repetition time (period) of the signals from the signal source 21 or to an integral multiple thereof. An oscillator of any known type may constitute the high frequency voltage source 22, or the signal source 21 may internally develop and deliver the required high frequency voltage. Signals from the signal source 21 may be passed through a known kind of synchronizing network 23 or used directly to synchronize or lock in the high frequency source 22 to have the same period as the rapid signal or a multiple thereof.

Figure 2:
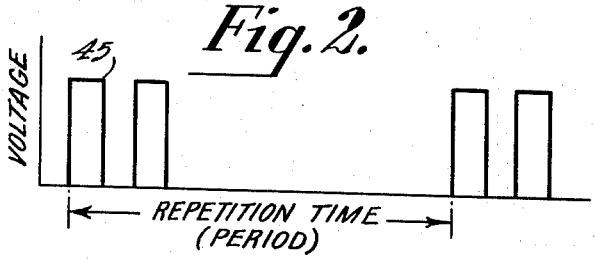
Figure 2 is a waveform of the signal for which a corresponding signal of lower frequency will be generated.

With the high frequency deflection voltage applied to the deflection plates, and the electron beam modulated by the signal shown in Figure 2, the two successive bursts of electrons for each beam traverse will strike the screen at the same two distinct points. The foregoing occurs because: (1) The recurring sinusoidal deflecting voltage has a greater or different deflection effect or amplitude when one burst passes through the deflection plates than it does when the other burst passes through; and (2) because the bursts always enter the deflection plates in the same phase.

The bursts of electrons *a* and *b* (Figure 3) will strike the screen at the same place every time the signal repeats. It may be desirable to add a phasing control on the high frequency voltage source 22 to permit movement of the bursts of electrons to a portion of the high frequency deflection voltage where that voltage is essentially linear. Such a phasing control may be a simple R–C network or microwave plumbing depending on the frequency used.

Figure 3:
Figure 3 is a front elevational view of the screen face of the cathode ray tube illustrating the mode of operation of the invention.

Referring to Figure 3, the thin conducting wire 12 is seen through the screen 13, to be positioned inside of the tube envelope in the plane of the deflection plates 20 to which high frequency deflection voltage is being applied. Assuming that wire 12 could be moved across the bursts of electrons, it would pick up a signal from the electron beam at points *a* and *b*. If the wire 12 is again moved across the bursts of electrons *a* and *b*, another identical signal would be picked up. Now if the wire 12 could be moved rapidly across the bursts, the signal would be a replica of the rapid repetition-rate signal that modulates the beam. It will have a repetition rate equal to the number of times the wire 12 traverses the electron bursts per second.

The effect of moving the wire across the electron beam is achieved electrically by superimposing a low frequency (preferably audio frequency) voltage upon the high frequency deflection voltage. A low frequency voltage source 24 is coupled to the high frequency deflection voltage source in a manner to be later described. Preferably the amplitude of the low frequency voltage is equal to the amplitude of the high frequency voltage. This effectively moves the electron beam across the conducting wire 12. A signal is derived by the conductive wire 12 at every traverse.

A stronger signal is derived from the conductive wire 12, taking advantage of the secondary emission from the wire, if a battery 25 is connected to negative potential with respect to the screen 13 on the conductive wire 12. The output signal may be connected to an amplifier 26 or any number of amplifiers to correct for any signal inversion due to 180 degree phase shifts of the signal produced by the cathode ray tube, and to amplify the signal. However, the output of the conductive wire 12 may be directly connected to a simple oscilloscope 27.

Figure 4:
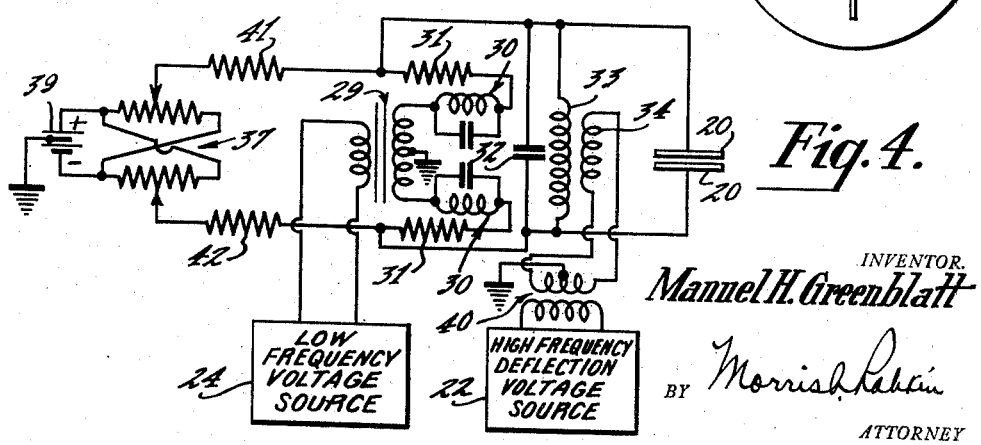
Figure 4 is a schematic circuit diagram illustrating a deflection voltage coupling circuit in an embodiment of the invention.

Referring to Figure 4, the circuit for superimposing the low frequency voltage upon the high frequency voltage is shown in greater detail than in Figure 1. The deflection plates 20 are connected across the beam centering control potentiometer circuit 37 and the isolation resistors 41 and 42. Coupling of the high frequency deflection voltage from its source 22 may be provided inductively by means of the transformer 40 and a pair of linking coils 33 and 34. A tuned circuit is used in this embodiment, and comprises a capacitor 32 and coil 33.

Superimposing the low frequency voltage on the high frequency voltage is accomplished by connecting the low frequency voltage source 24 to a transformer 29. A balanced output voltage is obtained from this transformer 29 and connected across the deflection plates 20 through shunt tuned circuits 30 and resistors 31. The shunt tuned circuits 30 are tuned to the frequency of the high frequency voltage. They effectively isolate the low frequency voltage source 24 from the high frequency voltage so that the voltages may appear linearly superimposed on the deflection plates 20.

Returning now to the synchronizing circuit 23, as previously mentioned in the specification of this invention, a synchronizing circuit may not be necessary if the signal source 21 will supply the high frequency deflection voltages. However, if a separate high frequency deflection voltage source 22 is used, it may be synchronized by coupling a portion of the rapid signal into the high frequency oscillator circuit. To synchronize the high frequency deflection voltage source 22 to have a period that is a multiple of the rapid signal (a period ten times as long, for example) it becomes necessary to use a scaling circuit. This type of circuit is well known. Further descriptions thereof may be found in "Waveforms," volume 19 of the Radiation Laboratories series, section 17.3.

Although the assumed signal is in the nature of pulses of rapid repetition rate for the sake of clearness of description, it will be understood that sinusoidal and other high frequency recurrent signals may be provided by the signal source 21 to generate signals which are lower frequency replicas thereof.

What is claimed is:

1. Apparatus for generating a corresponding electrical signal having a slow regular repetition rate from an electrical signal having a rapid regular repetition rate comprising a cathode ray tube, an electron gun in one end and a screen in the opposite end thereof, a pair of deflection plates spaced from said screen and said gun, means including said electron gun for producing an electron beam, means for applying said electrical signals having a rapid repetition rate to said electron gun for modulating the intensity of said electron beam, a source of high frequency voltage having a period equal to an integral multiple of the period of said rapid electrical signal, a source of low frequency voltage, means for superimposing said low frequency voltage upon said high frequency voltage and coupling the superimposed voltages to said deflection plates, and a conductor positioned in the path of said electron beam between said deflection plates and said screen to derive said slow electrical signal corresponding to said rapid electrical signal from said modulated and deflected electron beam.

2. The apparatus according to claim 1 including means for synchronizing said high frequency voltage with said rapid electrical signal.

3. An apparatus for generating a corresponding electrical signal having a slow regular repetition rate from an electrical signal having a rapid regular repetition rate comprising a cathode ray tube, an electron gun in one end and a screen in the opposite end thereof, at least one pair of deflection plates spaced from said screen and said gun, an electron beam being produced in said electron gun and projected in the direction of said screen, means for applying said signal having said rapid repetition rate to said electron gun for modulating the intensity of said electron beam, a source of high frequency voltage having a period equal to an integral multiple of the period of said electrical signal having said rapid repetition rate, a source of low frequency voltage, means for superimposing said low frequency voltage upon said high frequency voltage, said last-named means including means for coupling each of said source to said deflection plates and a thin wire conductor positioned parallel to the plane of said deflection plates and transversely to the path of said electron beam between said deflection plates and said screen to derive said slow electrical signal corresponding to said electrical signal having said rapid repetition rate from said modulated and deflected electron beam.

4. Apparatus for generating a corresponding electrical signal having a slow repetition-rate from a signal having a rapid repetition rate comprising means for providing an electron beam, means for modulating the intensity of said electron beam according to said rapid electrical signal, a relatively high frequency voltage source, a second voltage source for generating a voltage of lower frequency, means for superimposing said lower frequency voltage on said relatively high frequency voltage, means for deflecting said electron beam with said high frequency voltage superimposed on said low frequency voltage, an electronically conductive member in the path of said electron beam, and means for deriving said signal having the slow repetition rate on said member from said electron beam.

5. Apparatus for generating from an electrical signal having a rapid repetition rate a corresponding electrical signal having a slow repetition rate comprising means for providing an electron beam, means for modulating the intensity of said electron beam according to said rapid electrical signal, a relatively high frequency voltage source, a second voltage source for generating a voltage of lower frequency than said high frequency, means for superimposing said lower frequency voltage on said relatively high frequency voltage, means for deflecting said electron beam with said high frequency voltage superimposed on said low frequency voltage, conductive target means in the path of said electron beam for intercepting said beam at a point in its deflection path, and means for deriving said signal having a slow repetition rate from said target means.

References Cited in the file of this patent
UNITED STATES PATENTS

| | | |
|---|---|---|
| 2,414,843 | Varian et al. | Jan. 28, 1947 |
| 2,461,667 | Sunstein | Feb. 15, 1949 |
| 2,507,170 | Mesner | May 9, 1950 |
| 2,508,408 | Liebson | May 23, 1950 |
| 2,564,063 | Herold | Aug. 14, 1951 |